United States Patent
Wang et al.

(10) Patent No.: US 9,774,691 B2
(45) Date of Patent: Sep. 26, 2017

(54) SYSTEM, METHOD AND NON-TRANSITORY COMPUTER READABLE MEDIUM FOR EMBEDDING BEHAVIOR COLLECTION COMPONENT INTO APPLICATION OF MOBILE DEVICE AUTOMATICALLY

(71) Applicant: Institute for Information Industry, Taipei (TW)

(72) Inventors: Hao-Cheng Wang, New Taipei (TW); He-Wen Chen, Chiayi (TW); Rong-Sheng Wang, Taipei (TW); Shih-Chun Chou, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 405 days.

(21) Appl. No.: 14/096,123

(22) Filed: Dec. 4, 2013

(65) Prior Publication Data
US 2015/0143246 A1 May 21, 2015

(30) Foreign Application Priority Data

Nov. 20, 2013 (TW) .............................. 102142284 A (51) Int. Cl.
G06Q 30/00 (2012.01)
H04L 29/08 (2006.01)
G06F 3/048 (2013.01)

(52) U.S. Cl.
CPC .............. H04L 67/22 (2013.01); G06F 3/048 (2013.01)

(58) Field of Classification Search
CPC ..... G06A 30/02; G06A 30/0277; G06F 21/56; G06F 11/00; G06Q 30/02
(Continued)

(56) References Cited

U.S. PATENT DOCUMENTS

2007/0174490 A1* 7/2007 Choi .................... G06F 8/70
709/246
2009/0210890 A1* 8/2009 Tully .................. G06F 17/3089
719/331
(Continued)

FOREIGN PATENT DOCUMENTS

CN 101222349 A 7/2008

*Primary Examiner* — Vincent Cao
(74) *Attorney, Agent, or Firm* — McClure, Qualey & Rodack, LLP (57) ABSTRACT

A system for automatically embedding behavior collection components into a mobile device application; the system includes a user interface module, a recording module, a marking module, and an embedding module. The user interface module provides an operation interface which includes tracking items. The tracking items correspond to behavior collection components. The behavior collection components transmit operation information of the mobile device to a server. The recording module records relational information respectively corresponds to each of the behavior collection components, and each relational information is a relational function selected from of a plurality of relational functions of a library. The marking module determines and marks embedding positions of the behavior collection components in the mobile device application based on the behavior collection components of the selected tracking items and relational information thereof. The embedding module embeds the behavior collection components of the selected tracking items into the marked embedding positions.

20 Claims, 6 Drawing Sheets (58) Field of Classification Search
USPC .......................................................... 705/14
See application file for complete search history.

(56) References Cited

U.S. PATENT DOCUMENTS

| | | | |
|---|---|---|---|
| 2010/0037204 A1* | 2/2010 | Lin | G06Q 30/0267 717/106 |
| 2010/0058291 A1* | 3/2010 | Hahn | G06F 8/70 717/113 |
| 2010/0169176 A1* | 7/2010 | Turakhia | G06Q 30/02 705/14.52 |
| 2010/0281008 A1* | 11/2010 | Braunwarth | G06F 17/30867 707/705 |
| 2011/0066495 A1* | 3/2011 | Ayloo | G06Q 30/02 705/14.53 |
| 2011/0205174 A1 | 8/2011 | Oh | |
| 2012/0281080 A1 | 11/2012 | Wang | |
| 2012/0304161 A1* | 11/2012 | Ahadi | G06F 8/433 717/156 |
| 2013/0290854 A1* | 10/2013 | Shukla | G06F 17/3089 715/736 |

* cited by examiner

SYSTEM, METHOD AND NON-TRANSITORY COMPUTER READABLE MEDIUM FOR EMBEDDING BEHAVIOR COLLECTION COMPONENT INTO APPLICATION OF MOBILE DEVICE AUTOMATICALLY

RELATED APPLICATIONS

This application claims priority to Taiwan Application Serial Number 102142284, filed Nov. 20, 2013, which is herein incorporated by reference.

BACKGROUND

Field of Invention

The present invention relates to a system, method, and medium for a mobile device application. More particularly, the present invention relates to a system, method and computer readable medium for automatically embedding a behavior collection component into a mobile device application.

Description of Related Art

With the change of social, the consumption pattern of the consumers also changes. In modern society, mobile devices and mobile device applications (APPs) have been widely use. Accordingly, presenting advertisements in APPs have become a marketing means for attracting consumers. However, most of the current in-app advertisements are directed to non-specific consumers, and hence, not all consumers are willing to purchase. Therefore, the marketing effect of those in-app advertisements is limited.

In view of the foregoing insufficiency, it is desirable to have more knowledge regarding the user of the mobile device so as to present targeted marketing that provides suitable products to different consumers, thereby increasing the advertising efficacy. Hence, APP developers will like to understand the user behaviors, preferences or consumption patterns via the APP they developed so as to adaptively provide the advertisements or promotions regarding the products that the user need. However, if the developer wishes to collect the user behaviors, preferences or consumption patterns via APP, the APP developer has to include specific program codes according to the design concept of the designer or the market developer. In this case, the APP developer has to communicate with the designer or the market developer first, and then writes the program codes; this process renders the APP develop procedure rather complicated, and once the APP requires modification, the program codes responsible for the data collection shall be modified at the same time, which makes it more inconvenient. Moreover, since the APP developers are professional developer, the designers or the market developers cannot directly set the items of the information that they intend to collect or embed program codes in the APP.

In view of the foregoing, there exist problems and disadvantages in the existing products that await further improvement. However, those skilled in the art sought vainly for a solution.

SUMMARY

The following summary presents a simplified summary of the disclosure in order to provide a basic understanding to the reader. This summary is not an extensive overview of the disclosure and it does not identify key/critical elements of the present invention or delineate the scope of the present invention.

The invention provides a system, method and computer-readable storage medium for automatically embedding a behavior collection component into a suitable position in a mobile device application, which addresses the prior-art problem that the program codes could only be written by APP developers which result in the increased time cost and high technical threshold.

To this end, one aspect of the present disclosure is directed to a system for automatically embedding a behavior collection component into a mobile device application. The system comprises a user interface module, a recording module, a marking module and an embedding module. The user interface module is configured to provide an operation interface which comprises a plurality of tracking items, wherein each of the tracking items respectively corresponds to at least one behavior collection component, and each of the behavior collection components is configured to transmit operation information generated during the execution of the mobile device application in a mobile device to a server. The recording module is configured to record a plurality of relational information respectively correspond to each of the behavior collection components, wherein each of the relational information is a relational function selected from a plurality of functions of a library. The marking module is configured to, based on the behavior collection component of a selected tracking item of the plurality of tracking items and the relational information thereof, determine an embedding position of the behavior collection component in the mobile device application and make a marking based on the relational function. The embedding module is configured to embed the behavior collection component of the selected tracking item into the embedding position based on the marking.

According to one embodiment of the present disclosure, the system for automatically embedding a behavior collection component into a mobile device application further comprises a component-building module. The component-building module is configured to find a plurality of tracking functions respectively corresponding to each of the tracking items based on each of the tracking items, so as to build the behavior collection component respectively corresponding to each of the tracking items.

According to another embodiment of the present disclosure, the system for automatically embedding a behavior collection component into a mobile device application further comprises a relational information-building module. The relational information-building module is configured to set the tracking functions respectively corresponding to each of the tracking items as the relational function of the built corresponding behavior collection component, and store the relational function in the recording module as the relational information.

According to yet another embodiment of the present disclosure, the operation interface further comprises a plurality of event items and is configured to be assigned with an event, wherein the correspondence between each of the tracking items and at least one behavior collection components determined based on the assigned event so that each of the tracking items respectively corresponds to at least one behavior collection component. The marking module determines the embedding position of the behavior collection component and makes the marking based on the selected tracking item and the behavior collection component of the assigned event and the relational information thereof.

According to still another embodiment of the present disclosure, the system for automatically embedding a behavior collection component into a mobile device further comprises a behavior collection component database. The behavior collection component database is configured to store the behavior collection components.

According to yet another embodiment of the present disclosure, the system for automatically embedding a behavior collection component into a mobile device further comprises a storage module and a statistic module. The storage module is configured to store the plurality of operation information. The statistic module is configured to calculate the number of execution times of the tracking items based on the operation information.

According to another embodiment of the present disclosure, the system for automatically embedding a behavior collection component into a mobile device application further comprises an analyzing module. The analyzing module is configured to analyze the mobile device application before the marking module makes the marking, so as to generate a parsed data of the application and a source code.

To this end, another aspect of the present disclosure is directed to a method for automatically embedding a behavior collection component into a mobile device application. The method comprises the steps of: using a user interface module to provide an operation interface which comprises a plurality of tracking items, wherein each of the tracking items respectively corresponds to at least one behavior collection component; using each of the behavior collection components to transmit operation information generated during the execution of the mobile device application in a mobile device to a server; using a recording module to record a plurality of relational information respectively correspond to each of the behavior collection components, wherein each of the relational information is a relational function selected from a plurality of functions of a library; using a marking module to, based on the behavior collection component of a selected tracking item of the plurality of tracking items and the relational information thereof, determine an embedding position of the behavior collection component in the mobile device application and make a marking based on the relational function; and using an embedding module to embed the behavior collection component of the selected tracking item into the embedding position based on the marking.

To this end, yet another aspect of the present disclosure is directed to a non-transitory computer-readable storage medium having stored thereon a plurality of program codes executable by an electronic device to automatically embed a behavior collection component into a mobile device application, comprising: a first program code, a second program code, a third program code and a fourth program code. The first program code is configured to provide an operation interface which comprises a plurality of tracking items, wherein each of the tracking items respectively corresponds to at least one behavior collection component, and each of the behavior collection components is configured to transmit operation information generated during the execution of the mobile device application in a mobile device to a server. The second program code is configured to record a plurality of relational information respectively correspond to each of the behavior collection components, wherein each of the relational information is a relational function selected from a plurality of functions of a library. The third program code is configured to, based on the behavior collection component of a selected tracking item of the plurality of tracking items and the relational information thereof, determine an embedding position of the behavior collection component in the mobile device application and make a marking based on the relational function. The fourth program code is configured to embed the behavior collection component of the selected tracking item into the embedding position based on the marking.

In view of the foregoing, embodiments of the present disclosure provide a system, method and computer-readable storage medium for automatically embedding a behavior collection component into a mobile device application to improve the problems associated with the APP developer spending extra times and efforts to communicate with designers or market developers, writing program codes. The present disclosure provides an easy-to-use operating interface and tracking items so that personnel without programming capability can assign tracking items so that the behavior collection components can be automatically embedded into mobile device applications.

These and other features, aspects, and advantages of the present invention, as well as the technical means and embodiments employed by the present invention, will become better understood with reference to the following description in connection with the accompanying drawings and appended claims.

BRIEF DESCRIPTION OF THE DRAWINGS

The invention can be more fully understood by reading the following detailed description of the embodiment, with reference made to the accompanying drawings as follows.

In accordance with common practice, the various described features/elements are not drawn to scale but instead are drawn to best illustrate specific features/elements relevant to the present invention. Also, wherever possible, like or the same reference numerals are used in the drawings and the description to refer to the same or like parts.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular Moreover, as used herein, the terms "couple" or "connect" refer to the physical or electrical contacts between two or more elements with each other, either directly or indirectly, or the mutual operation or interaction between two or more elements.

Figure 1:
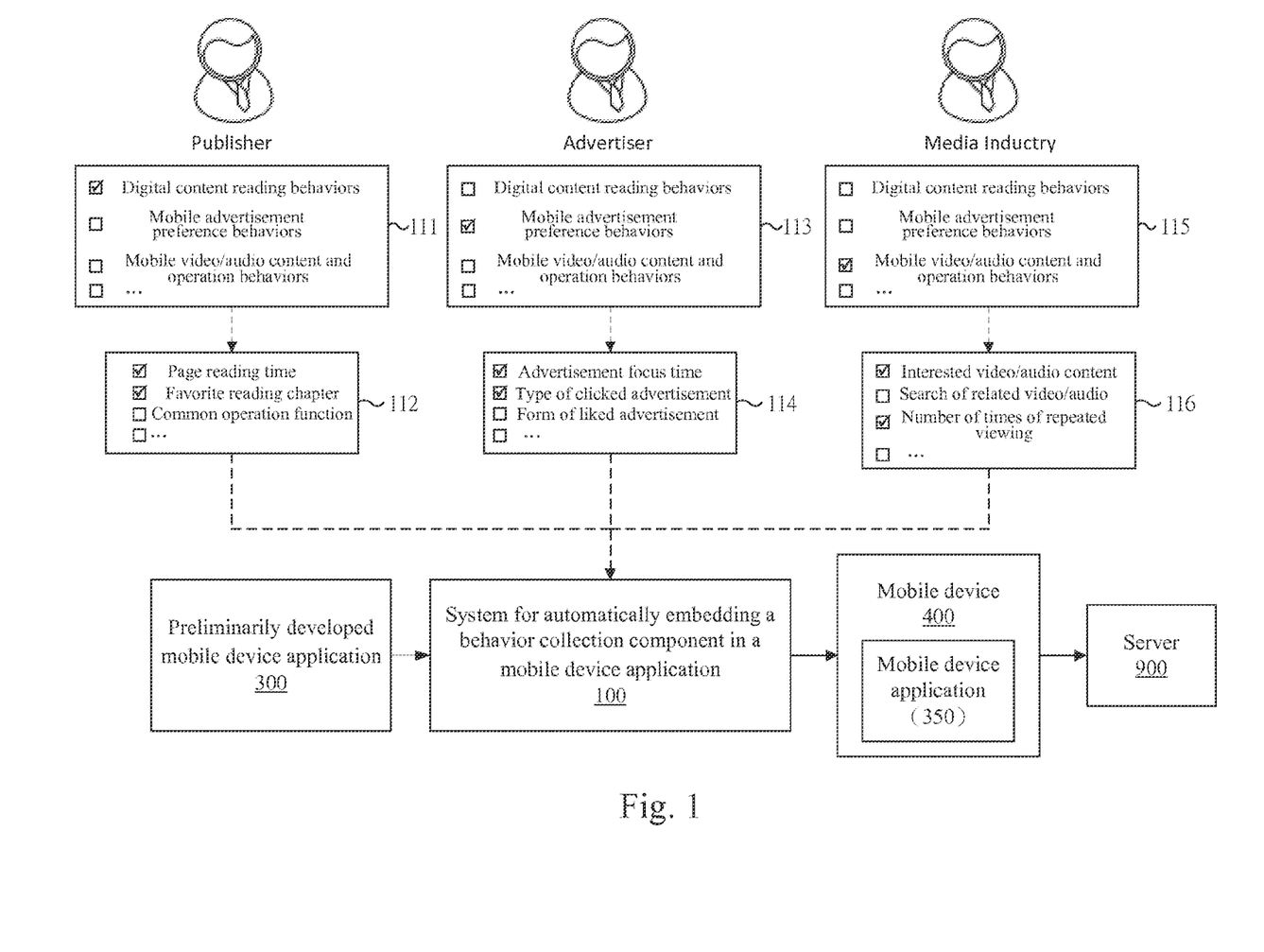
FIG. 1 is a schematic diagram illustrating the operation of a system for automatically embedding behavior collection component in a mobile device application according to one embodiment of the present disclosure.

FIG. 1 is a schematic diagram illustrating the operation of a system 100 for automatically embedding behavior collection component in a mobile device application according to one embodiment of the present disclosure. As illustrated, the system 100 for automatically embedding a behavior collection component into a mobile device application (hereinafter, the system 100) may provide the user an easy-to-use operation interface 111, 113 and 115, so that the user may select the item to be tracked; the system 100 then embed a behavior collection component corresponding to the selected tracking item in a preliminarily developed mobile device application (300) based on the selected tracking item, so as to generate a mobile device application (350) comprising the behavior collection component. When the mobile device application (350) is installed on a mobile device (400) and then activated for execution, it tracks the user's operation information of the corresponding selected tracking item on the mobile device (400), and then transmits the operation information to the server 900 via a communication network. In this way, the server 900 can collect, calculate or analyze the user's operation information, calculate, so as to provide the user advertisements of products that are more suitable or interesting to the user based on the results of the above-mentioned calculation or analysis.

In certain embodiments, for example, the system 100 may provide user operation interface 111, 113 and 115, said operation interface 111, 113 and 115 may provide a plurality of tracking items for selection; for example, the tracking item can be digital content reading behaviors, mobile advertisement preference behaviors, mobile video/audio content and operation behaviors, etc. A content developer may be interested in the digital content reading behaviors; accordingly, the publisher may select the digital content reading behaviors. Moreover, an advertiser may select mobile advertisement preference behaviors, while the media industry may select digital video/audio content and operation behaviors. Take the publisher as an example, the system 100 may embed a corresponding behavior collection component in a preliminarily developed mobile device application (300) based on the digital content reading behaviors selected by the publisher, so as to generate a mobile device application (350) comprising the behavior collection component. When the mobile device application (350) is executed in the mobile device (400), it may track the user's digital content reading behaviors on the mobile device (400), such as the duration the user stay in a specific page (content), and transmit the information associated to the digital content reading behaviors to the server 900.

Further, tracking items in the operation interface 111, 113 and 115 may be provided in a hierarchical menu for selection; as illustrated in FIG. 1, after the user select the tracking item 111, 113 and 115 in the first layer of the operation interface, the system 100 further provides a second layer presenting more detailed tracking items; for example, it may be displayed using another operation interface 112, 114 and 116; alternatively, it may be displayed together with the tracking items in the first layer of a same operation interface. For example, after a publisher selects the digital content reading behaviors of the operation interface 111, the system 100 may provide another operation interface 112 providing more detailed tracking items such as page reading time, favorite reading chapter, common operation function, etc. for the user to make further settings. Alternatively, after the advertiser select the mobile advertisement preference behaviors, the operation interface 114 provided by the system 100 further comprises advertisement focus time, type of clicked advertisement, form of liked advertisement, etc. for the user to make further settings. Moreover, after the media industry select the digital video/audio content and operation behaviors, the operation interface 116 provided by the system 100 further comprises interested video/audio content, search of related video/audio, number of times of repeated viewing, etc. for the user to make further settings. However, the present disclosure is not limited to FIG. 1 which merely illustratively exemplified one method of implementing the present disclosure. The above discussion only present the technical overview of the present disclosure so as to facilitate the understanding of the overall concept of present disclosure, the means for implementing the present disclosure will be discussed hereinbelow.

Figure 2:
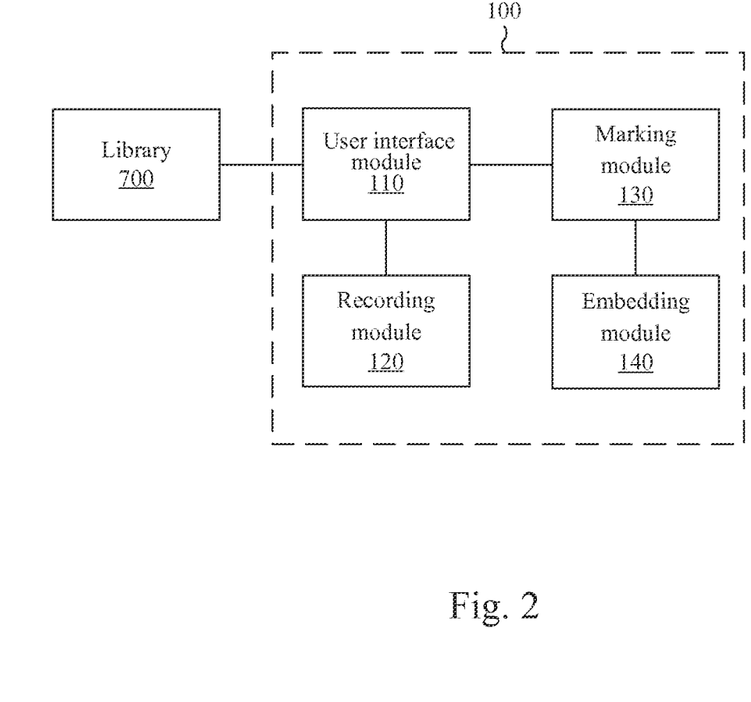
FIG. 2 is a schematic diagram illustrating the operation of a system for automatically embedding behavior collection component in a mobile device application according to another embodiment of the present disclosure.

FIG. 2 is a schematic diagram illustrating the operation of a system 100 for automatically embedding behavior collection component in a mobile device application according to one embodiment of the present disclosure. As illustrated, the system 100 comprises a user interface module 110, a recording module 120, a marking module 130 and an embedding module 140. In connection, the user interface module 110 is connected to the recording module 120 and the marking module 130, the marking module 130 is connected to the embedding module 140, whereas the user interface module 110 is further connected to an external library 700.

To further facilitate the understanding of the system 100 according to the present disclosure, refer to both FIG. 1 and FIG. 2. In operation, the user interface module 110 provides at least one operation interface, e.g., operation interface 111~116, each of the operation interfaces may provide a plurality of tracking items, each of the tracking items respectively corresponds to at least one behavior collection component, each of the behavior collection components is configured to transmit operation information generated during the execution of the mobile device application (APP) in the mobile device to the server 900. Said operation information means, during the operation of the mobile device application, all kinds of information regarding the user's operation associated with the pages, each static or dynamic element (such as the buttons, picture links, advertisement files provided by the mobile device application), or information regarding the stay duration on a specific page, the contents being clicked and whether purchase is placed.

The recording module 130 is configured to record the relational information of each behavior collection component, wherein each of the relational information is a relational function selected from a plurality of functions of a library 700. In certain embodiments, the library 700 may be a commercially available or publicly accessible library, such as the iOS operating system library powered by Apple, the Android operating system library powered Google and the Windows operating system library powered by Microsoft.

The marking module 130, based on the behavior collection component of a selected tracking item of the plurality of tracking items and the relational information thereof, determines an embedding position of the behavior collection component in the mobile device application and makes a marking based on the relational function. The embedding module 140 embeds the behavior collection component of the selected tracking item into the embedding position based on the marking.

In this way, since the system 100 provides an easy-to-use operation interface 111~116, the user may select the items to be tracked according to his/her needs, and then the system 100 can embed the corresponding behavior collection component (comprising tracking program codes) in the mobile device application; accordingly, the system 100 of the present disclosure provides a fast, easy-to-use and effective means to address the prior-art problem that the program codes could only be written by APP developers which result in the increased time cost.

Figure 3:
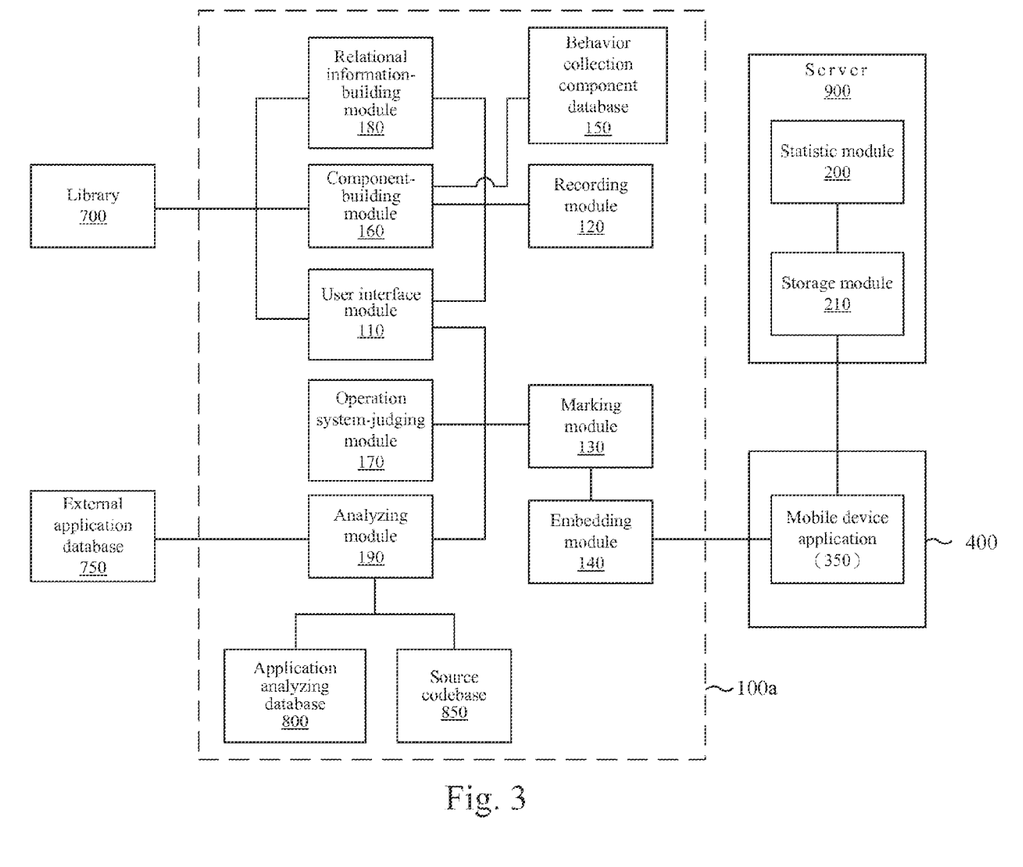
FIG. 3 is a schematic diagram illustrating the operation of a system for automatically embedding behavior collection component in a mobile device application according to still another embodiment of the present disclosure.

FIG. 3 is a schematic diagram illustrating the operation of a system 100a for automatically embedding behavior collection component in a mobile device application according to still another embodiment of the present disclosure. It should be noted that in FIG. 2 and FIG. 3, the elements/components with the same numeral identifier are elements/components having the same operational relationship. Accordingly, the operational relationship of these elements/components is omitted herein for the sake of brevity. Comparing with the system 100 illustrated in FIG. 2, the system 100a for automatically embedding a behavior collection component into a mobile device application (hereinafter, system 100a) illustrated in FIG. 3 further comprises a behavior collection component database 150, a component-building module 160, an operation system-judging module 170, a relational information-building module 180, an analyzing module 190, a statistic module 200 and a storage module 210.

In connection, the behavior collection component database 150 is connected to the component-building module 160, while the component-building module 160, the user interface module 110, the recording module 120, relational information-building module 180 and the external library 700 are interconnected with one another. The marking module 130 is further connected to the analyzing module 190, and the analyzing module 190 is further connected to the external application database 750, the external application analyzing database 800 and the external source codebase 850. The mobile device application 350 created by the embedding module 140 may be installed and run on the mobile device 400, and is connected to the statistic module 200 and the storage module 210. The arrangement of the elements/components of the system 100a according to the present disclosure is not limited to that illustrated in FIG. 3; the statistic module 200 and storage module 210 may not only be disposed in the external server 900, in one embodiment, the statistic module 200 and storage module 210 may also be disposed inside the system 100a, depending on the actual need.

In operation, the behavior collection component discussed in FIG. 2 is generated by the component-building module 160; specifically, the component-building module 160, based on each of the tracking items, will find, from the functions in the library 700, a plurality of tracking functions respectively corresponding to each of the tracking items, so as to generate the behavior collection components respectively corresponding to each of the tracking items. In one embodiment, the behavior collection component database 150 may store the behavior collection component generated by the component-building module 160. Further, the relational information described in FIG. 2 is generated by the relational information-building module 180 specifically, the relational information-building module 180 sets the tracking functions respectively corresponding to each of the tracking items as the relational functions for generating respective corresponding behavior collection components, and stores the tracking functions in the recording module 120 as the relational information.

In one embodiment, the operation interface provided by the user interface module 110 further comprises a plurality of detailed tracking items, which can be event items for assigning an assigned event. Referring to FIG. 1, the detailed tracking items or the event items may be the page reading time, favorite reading chapter, common operation function, etc. that are provided by the operation interface 112, 114 and 116. As illustrated, the user may assign the page reading time and the favorite reading chapter as the assigned events; thereafter, each of the tracking items, based on the assigned events, may respectively correspond to at least one behavior collection component. Further, the marking module 130 may, based on the selected tracking item and the behavior collection component of the assigned event and the relational information thereof, determines the embedding position of the behavior collection component and makes the marking.

Figure 4:
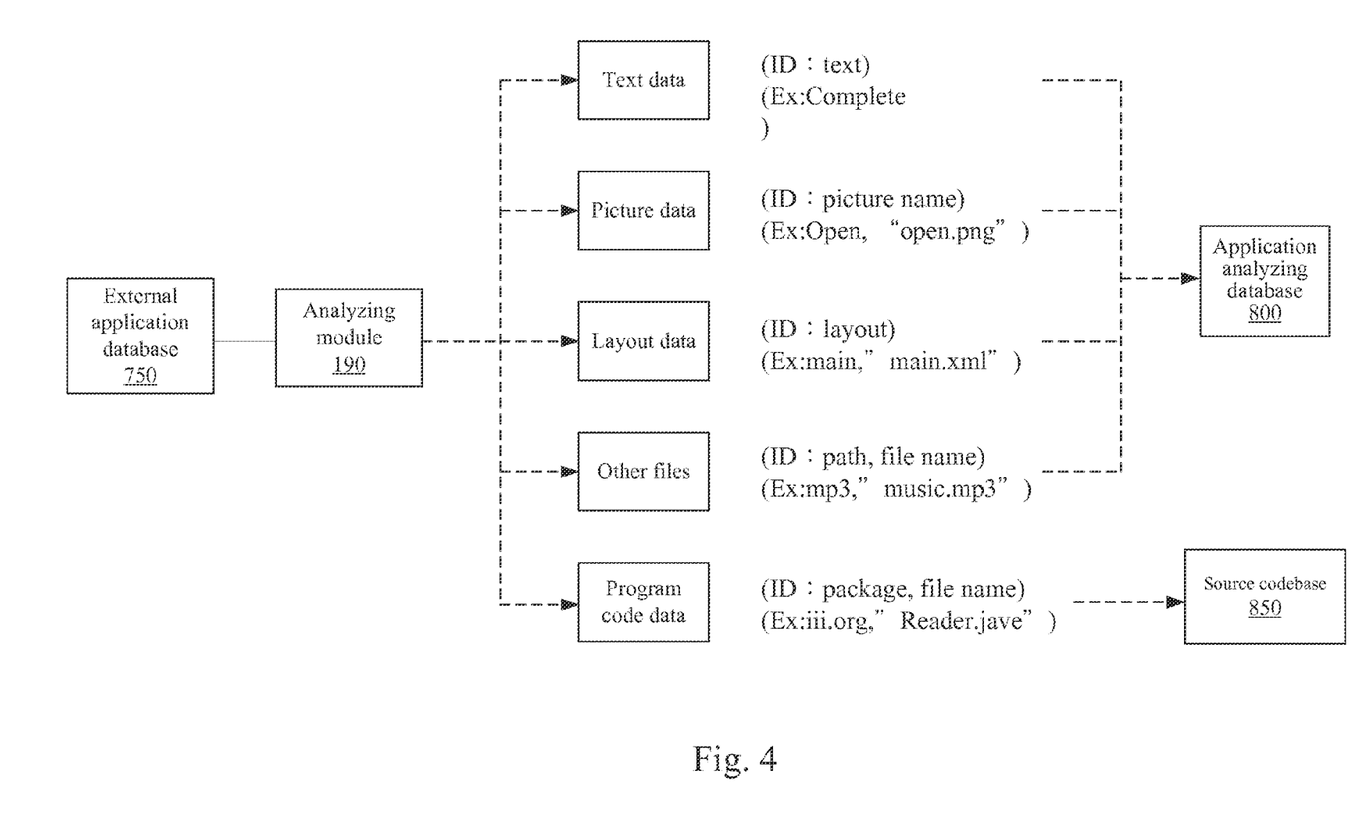
FIG. 4 is a schematic diagram illustrating the operation of a portion of components of a system for automatically embedding behavior collection component in a mobile device application according to the embodiment of FIG. 3.

In another embodiment, the analyzing module 190 is configured to obtain the mobile device application from the application database 750 and analyze the mobile device application before the marking module 130 makes the marking. Referring to FIG. 4, which is a schematic diagram illustrating the operation of a portion of components of the system 100a of FIG. 3. As illustrated, after the analyzing module 190 analyzes the mobile device application, it generates the text data, picture data, layout data, other files, source code, etc. Said text data, picture data, layout data and other files belong to the parsed data of the application, and will be stored in the application analyzing database 800, whereas the source code will be stored in the source codebase 850.

Additionally, the analyzing module 190 further assigns identifiers (ID) for each of the parsed data of the application, respectively; for example, the alias of the text data is "complete", then an identifier of "complete" may be assigned thereto; for a picture data having a file name of "open.png", the identifier of "open" may be assigned thereto; for a layout data having a file name of "main.xml", the identifier of "main" may be assigned thereto; other files can be assigned with an identifier according to the file path and file name, for example, an identifier of "mp3_music.mp3" can be assigned. Similarly, the analyzing module 190 may, based on the package name of the source code and the file name of the file comprising the program code, assign an identifier of "iii.org_Reader.java". The meaning of using the analyzing module 190 to assign the identifier is that it facilitates the discrimination and acquirement of the required parsed data of the application and source code.

Figure 5:
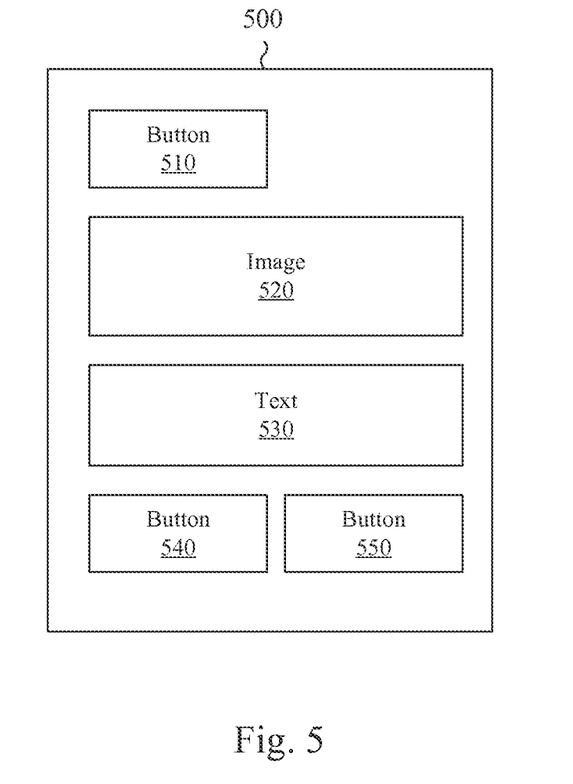
FIG. 5 is a schematic diagram illustrating the page generated by a mobile device application according to yet another embodiment of the present disclosure.

In the present embodiment, referring to FIG. 5, the layout data records a plurality of elements on a page 500 generated by the mobile device application, such as Button 510, Image 520, Text 530, Button 540 and Button 550, and the analyzing module 190 further assigns an identifier for each of the elements. Additionally, the selected tracking item displays the page 500 through the operation interface and is determined based on a tracking element of the elements. Further, the marking module 130 is further configured to determine the embedding position from the source code based on the identifier of the tracking element.

In still another embodiment, since the mobile devices may employ different kinds of operating systems, the behavior collection components to be embedded into the mobile device application also differ. Accordingly, the system 100a further comprises the operation system-judging module 170 to judge the operating system employed by the mobile device so as to correspondingly embed the behavior collection component compatible with the operating system of the mobile device.

In one embodiment, the storage module 210 and the statistic module are disposed in the system 100a, and they can communicate with the remote mobile device 400 installed with the mobile device application 350 via wired or wireless communication network. The storage module 210 is configured to store the operation information transmitted from the mobile device 400, and the statistic module 200 may, based on the operation information, calculate the number of execution times of the tracking item, and then uses the calculated data to understand the operating behaviors or interested products or interested products of the user of the mobile device 400 so as to provide suitable product advertisement to the user.

Figure 6:
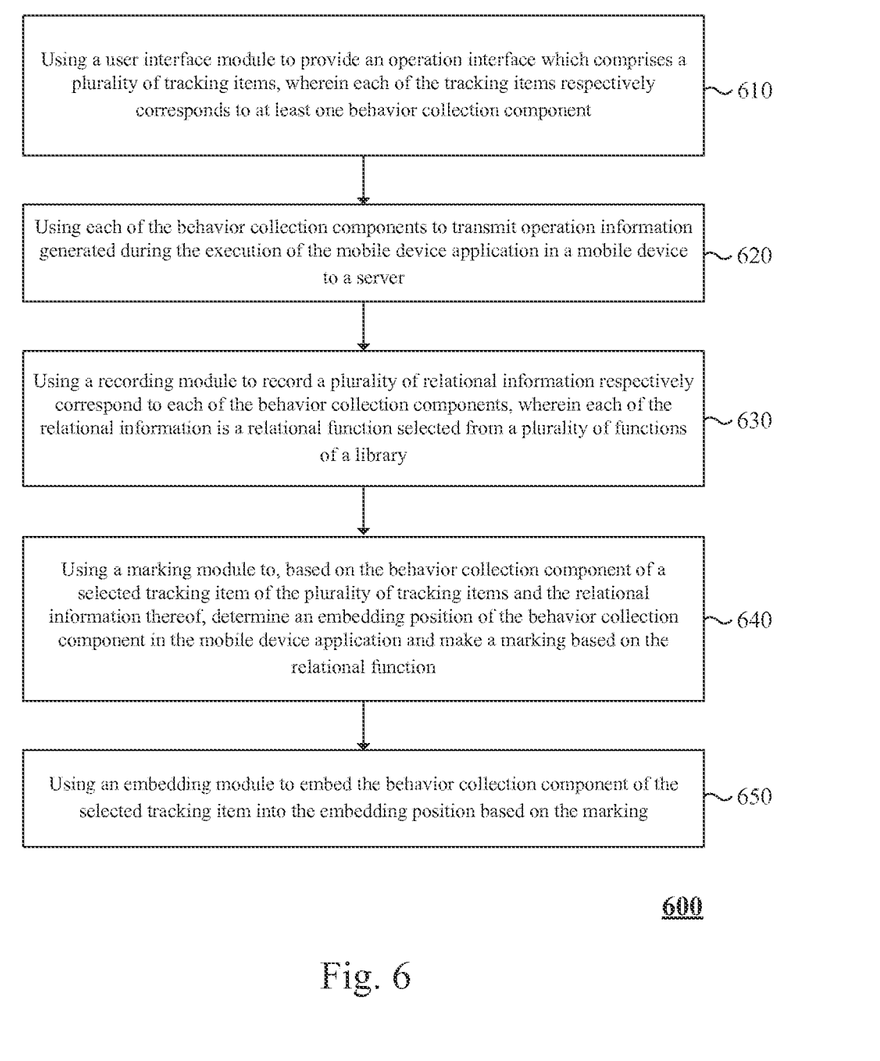
FIG. 6 is a flow diagram illustrating the process steps of a method for automatically embedding behavior collection component in a mobile device application according to embodiments of the present disclosure.

FIG. 6 is a flow diagram illustrating the process steps of a method 600 for automatically embedding behavior collection component in a mobile device application according to embodiments of the present disclosure. As illustrated, the method 600 for automatically embedding behavior collection component in a mobile device application (hereinafter, method 600) comprises the following steps:

Step 610: using a user interface module to provide an operation interface which comprises a plurality of tracking items, wherein each of the tracking items respectively corresponds to at least one behavior collection component;

Step 620: using each of the behavior collection components to transmit operation information generated during the execution of the mobile device application in a mobile device to a server;

Step 630: using a recording module to record a plurality of relational information respectively correspond to each of the behavior collection components, wherein each of the relational information is a relational function selected from a plurality of functions of a library;

Step 640: using a marking module to, based on the behavior collection component of a selected tracking item of the plurality of tracking items and the relational information thereof, determine an embedding position of the behavior collection component in the mobile device application and make a marking based on the relational function; and Step 650: using an embedding module to embed the behavior collection component of the selected tracking item into the embedding position based on the marking.

To further facilitate the understanding of the method 600, refer to both FIG. 2 and FIG. 6. In Step 610, the method may use the user interface module 110 to provide the operation interface comprising a plurality of tracking items, wherein each of the tracking items respectively corresponds to at least one behavior collection component. Next, as illustrated in Step 620, the method may use each of the behavior collection components to transmit operation information generated during the execution of the mobile device application in a mobile device to a server. Thereafter, referring to Step 630, the method may use the recording module 120 to record the relational information of each behavior collection component, wherein the relational information is a relational function of the behavior collection component that corresponds to one of the multiple relational functions in the library.

Next, in Step 640, the method may use the marking module 130 to, based on the behavior collection component of a selected tracking item of the plurality of tracking items and the relational information thereof, determine an embedding position of the behavior collection component in the mobile device application and make a marking based on the relational function. Then, referring to Step 650, the method may use the embedding module 140 embed the behavior collection component of the selected tracking item into the embedding position based on the marking.

In this way, since the method 600 provides an easy-to-use operation interface, the user can selected the item to be tracked depending on his or her needs, and embed the corresponding behavior collection component (comprising the tracking program code) into the mobile device application; hence, the method 600 according to the present disclosure provides a fast, easy-to-use and effective means to address the prior-art problem that the program codes could only be written by APP developers which result in the increased time cost.

Referring to both FIG. 3 and FIG. 6; in one embodiment, the method 600 further comprises the step of: using the component-building module 160 to find from the library 500 a plurality of tracking functions respectively corresponding to each of the tracking items based on each of the tracking items, so as to build the behavior collection component respectively corresponding to each of the tracking items. Moreover, the method 600 further comprises the step of: using the relational information-building module 180 to set the tracking functions respectively corresponding to each of the tracking items as the relational function of the built corresponding behavior collection component, and store the relational function in the recording module 120 as the relational information.

Referring to both FIG. 3 and FIG. 6, in Step 610, the method may further use the user interface module 110 to provide the operation interface further comprising a plurality of event items, and the operation interface is configured to be assigned with an event, wherein each of the tracking items respectively corresponds to at least one behavior collection component based on the assigned event. Moreover, in Step 640, the method may further use the marking module 130 to determine the embedding position of the behavior collection component and makes the marking based on the selected tracking item and the behavior collection component of the assigned event and the relational information thereof.

In another embodiment, the method 600 further comprises the step of: using the storage module 210 to store the plurality of operation information and using the statistic module 200 to calculate the number of execution times of the tracking items based on the operation information. In yet another embodiment, the method 600 further comprises the step of: using the analyzing module 190 to analyze the mobile device application before the marking module 130 makes the marking, so as to generate a parsed data of the application and a source code. In yet another embodiment, the method 600 further comprises the step of: using the operation system-judging module 170 to judge the operating system employed by the mobile device operation.

In still another embodiment, the parsed data of the application include the text data, picture data and layout data, the layout data records a plurality of elements on a page generated by the mobile device application moreover, and the method 600 further comprises the step of using the analyzing module 190 to respectively assign an identifier for each of the elements. Further, the method 600 further comprises the step of: using the operation interface to display the page and based on a tracking element of the elements; moreover, the method may further use the marking module 130 to determine the embedding position from the source code based on the identifier of the tracking element.

The above-described method 600 for automatically embedding a behavior collection component in a mobile device application can be implemented by the software, hardware and/or firmware. For example, if an implementer determines that speed and accuracy are paramount, the implementer may opt for a mainly hardware and/or firmware implementation; if flexibility is paramount, the implementer may opt for a mainly software implementation; alternatively, the collaboration of the software, hardware and firmware may be adopted. It should be noted that, none of the above-mentioned examples is inherently superior to the other and shall be considered limiting to the scope of the in present invention; rather, these examples can be utilized depending upon the context in which the unit/component will be deployed and the specific concerns of the implementer.

Further, as could be appreciated by persons having ordinary skill in the art, the steps of the method 600 for automatically embedding a behavior collection component in a mobile device application are named according to the function they performed, and such naming are provided to facilitate the understanding of the present disclosure but not to limit the steps. Combining each step into a single step or dividing it into multiple steps, or switching any step into another step may be done consistent with the embodiments of the present disclosure.

The above-mentioned method 600 for automatically embedding a behavior collection component in a mobile device application can be implemented as a computer program that is stored in a computer-readable storage medium so that after the computer reads said storage medium the computer performs the method 600. The computer-readable storage medium may be a read-only memory, flash memory, floppy disk, hard disk, compact disk, USB dick, magnetic tape, a database that may be accessed via internet, or other computer-readable storage media that can easily conceived by persons having ordinary skill in the art and preform the same function. The above-mentioned method 600 for automatically embedding a behavior collection component in a mobile device application can also be implemented by incorporating the computer program and one or more processors or chips.

In view of the above embodiments of the present disclosure, it is apparent that the application of the present invention has the advantages as follows. Embodiments of the present disclosure provides a system 100 and 100 a and method 600 for automatically embedding a behavior collection component into a mobile device application, which address the prior-art problem that the program codes could only be written by APP developers which result in the increased time cost and high technical threshold; it improves the problems associated with the APP developer spending extra times and efforts to communicate with designers or market developers, writing program codes; the present disclosure provides an easy-to-use operating interface and tracking choices so that personnel without programming capability can assign tracking items so that the behavior collection components can be automatically embedded into mobile device applications.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A system for automatically embedding a behavior collection component into a mobile device application, comprising:
   a processor configured to execute steps as follows:
   providing an operation interface which comprises a plurality of tracking items, wherein each of the tracking items respectively corresponds to at least one behavior collection component, and each of the behavior collection components is configured to transmit operation information generated during the execution of the mobile device application in a mobile device to a server;
   recording a plurality of relational information respectively correspond to each of the behavior collection components, wherein each of the relational information is a relational function selected from a plurality of functions of a library;
   determining an embedding position of the behavior collection component in the mobile device application based on the behavior collection component of a selected tracking item of the plurality of tracking items and the relational information thereof and making a marking based on the relational function; and
   embedding the behavior collection component of the selected tracking item into the embedding position based on the marking.

2. The system for automatically embedding a behavior collection component into a mobile device application according to claim 1, wherein the processor is further configured to execute step as follows:
   finding a plurality of tracking functions respectively corresponding to each of the tracking items based on each of the tracking items, so as to build the behavior collection component respectively corresponding to each of the tracking items.

3. The system for automatically embedding a behavior collection component into a mobile device application according to claim 2, wherein the processor is further configured to execute step as follows:
   setting the tracking functions respectively corresponding to each of the tracking items as the relational function of the built corresponding behavior collection component, and storing the relational function as the relational information.

4. The system for automatically embedding a behavior collection component into a mobile device application according to claim 1, wherein the processor is further configured to execute steps as follows:
   providing the operation interface further comprising a plurality of events and being configured to be assigned with an event, wherein the correspondence between each of the tracking items and at least one behavior collection components determined based on the assigned event so that each of the tracking items respectively corresponds to at least one behavior collection component; and determining the embedding position of the behavior collection component and making the marking based on the selected tracking item and the behavior collection component of the assigned event and the relational information thereof.

5. The system for automatically embedding a behavior collection component into a mobile device application according to claim 1, wherein the processor is further configured to execute step as follows:

storing the behavior collection components.

6. The system for automatically embedding a behavior collection component into a mobile device application according to claim 1, wherein the processor is further configured to execute step as follows:

storing the plurality of operation information; and calculating the number of execution times of the tracking items based on the operation information.

7. The system for automatically embedding a behavior collection component into a mobile device application according to claim 1, wherein the processor is further configured to execute step as follows:

analyzing the mobile device application before making the marking, so as to generate a parsed data of the application and source code.

8. The system for automatically embedding a behavior collection component into a mobile device application according to claim 7, wherein the parsed data of the application comprises a text data, a picture data and a layout data, the layout data records a plurality of components on a page generated by the mobile device application, and the analyzing module further assigns an identifier for each of the elements.

9. The system for automatically embedding a behavior collection component into a mobile device application according to claim 8, wherein the processor is configured to execute steps as follows determining the selected tracking item by using the operation interface to display the page and based on a tracking element of the elements; and determining the embedding position from the source code based on the identifier of the tracking element.

10. The system for automatically embedding a behavior collection component into a mobile device application according to claim 1, wherein the processor is further configured to execute step as follows:

judging the operating system employed by the mobile device.

11. A method for automatically embedding a behavior collection component into a mobile device application, comprising:

providing an operation interface by a user interface module, wherein the operation interface comprises a plurality of tracking items, and each of the tracking items respectively corresponds to at least one behavior collection component;

transmitting operation information by each of the behavior collection components, wherein the operation information is generated during the execution of the mobile device application in a mobile device to a server;

recording a plurality of relational information by the recording module, wherein the plurality of relational information respectively correspond to each of the behavior collection components, and each of the relational information is a relational function selected from a plurality of functions of a library;

determining an embedding position of the behavior collection component in the mobile device application by a marking module based on the behavior collection component of a selected tracking item of the plurality of tracking items and the relational information thereof and making a marking by the marking module based on the relational function; and embedding the behavior collection component of the selected tracking item into the embedding position by an embedding module based on the marking.

12. The method for automatically embedding a behavior collection component into a mobile device application according to claim 11, further comprising:

finding a plurality of tracking functions by a component-building module, wherein the tracking functions respectively correspond to each of the tracking items based on each of the tracking items, so as to build the behavior collection component respectively corresponding to each of the tracking items.

13. The method for automatically embedding a behavior collection component into a mobile device application according to claim 12, further comprising:

setting the tracking functions by a relational information-building module, wherein the tracking functions respectively correspond to each of the tracking items as the relational function of the built corresponding behavior collection component, and store the relational function in the recording module as the relational information.

14. The method for automatically embedding a behavior collection component into a mobile device application according to claim 11, wherein the step of "providing the operation interface by the user interface module, wherein the operation interface comprises a plurality of tracking items, and each of the tracking items respectively corresponding to at least one behavior collection component" comprises:

providing the operation interface by the user interface module, wherein the operation interface further comprises a plurality of event items, and the operation interface is configured to be assigned with an event, wherein each of the tracking items respectively corresponds to at least one behavior collection component based on the assigned event;

wherein the step of "determining the embedding position of the behavior collection component in the mobile device application by the marking module based on the behavior collection component of the selected tracking item of the plurality of tracking items and the relational information thereof and making the marking by the marking module based on the relational function" further comprises:

determining the embedding position of the behavior collection component by the marking module and making the marking by the marking module based on the selected tracking item and the behavior collection component of the assigned event and the relational information thereof.

15. The method for automatically embedding a behavior collection component into a mobile device application according to claim 11, further comprising:

storing the behavior collection components by a behavior collection component database.

16. The method for automatically embedding a behavior collection component into a mobile device application according to claim 11, further comprising:
- storing the plurality of operation information by a storage module; and
- calculating the number of execution times of the tracking items by a statistic module based on the operation information.

17. The method for automatically embedding a behavior collection component into a mobile device application according to claim 11, further comprising:
- analyzing the mobile device application by an analyzing module before the marking module makes the marking, so as to generate a parsed data of the application and a source code.

18. The method for automatically embedding a behavior collection component into a mobile device application according to claim 17, wherein the parsed data of the application comprises a text data, a picture data and a layout data, the layout data records a plurality of elements on a page generated by the mobile device application, and the method further comprises:
- assigning a identifier for each of the elements respectively by the analyzing module.

19. The method for automatically embedding a behavior collection component into a mobile device application according to claim 18, further comprising:
- displaying the page by the operation interface and determining the selected tracking item based on a tracking element of the elements;
- wherein the step of "determining the embedding position of the behavior collection component in the mobile device application by the marking module based on the behavior collection component of the selected tracking item of the plurality of tracking items and the relational information thereof and making the marking by the marking module based on the relational function" comprises:
  - determining the embedding position from the source code by the marking module based on the identifier of the tracking element.

20. A non-transitory computer-readable storage medium having stored thereon a plurality of program codes executable by an electronic device to automatically embed a behavior collection component into a mobile device application, comprising:
- a first program code, configured to provide an operation interface which comprises a plurality of tracking items, wherein each of the tracking items respectively corresponds to at least one behavior collection component, and each of the behavior collection components is configured to transmit operation information generated during the execution of the mobile device application in a mobile device to a server;
- a second program code, configured to record a plurality of relational information respectively correspond to each of the behavior collection components, wherein each of the relational information is a relational function selected from a plurality of functions of a library;
- a third program code, configured to, based on the behavior collection component of a selected tracking item of the plurality of tracking items and the relational information thereof, determine an embedding position of the behavior collection component in the mobile device application and make a marking based on the relational function; and
- a fourth program code, configured to embed the behavior collection component of the selected tracking item into the embedding position based on the marking.

* * * * *